United States Patent
Khoury (10) Patent No.: US 11,849,346 B2
(45) Date of Patent: Dec. 19, 2023

(54) UNILATERAL QUALITY-OF-SERVICE MIRRORING

(71) Applicant: ARRIS Enterprises LLC, Suwanee, GA (US)

(72) Inventor: Peter G. Khoury, San Francisco, CA (US)

(73) Assignee: ARRIS Enterprises LLC, Suwanee, GA (US)

( * ) Notice: Subject to any disclaimer, the term of this patent is extended or adjusted under 35 U.S.C. 154(b) by 155 days.

(21) Appl. No.: 17/401,464

(22) Filed: Aug. 13, 2021

(65) Prior Publication Data

US 2022/0060930 A1    Feb. 24, 2022

Related U.S. Application Data (60) Provisional application No. 63/192,869, filed on May 25, 2021, provisional application No. 63/067,632, filed on Aug. 19, 2020.

(51) Int. Cl.
*H04W 28/02* (2009.01)
*H04W 24/08* (2009.01)

(52) U.S. Cl.
CPC ....... *H04W 28/0268* (2013.01); *H04W 24/08* (2013.01)

(58) Field of Classification Search
CPC . H04W 28/0268; H04W 24/08; H04W 28/02; H04W 28/24; H04L 45/66; H04L 47/6215; H04L 47/2491
See application file for complete search history.

(56) References Cited

U.S. PATENT DOCUMENTS

| | | | |
|---|---|---|---|
| 2010/0208609 A1 | 8/2010 | Sundarraman et al. | |
| 2016/0338073 A1 | 11/2016 | Nuggehalli et al. | |
| 2019/0097936 A1 | 3/2019 | Yang et al. | |
| 2021/0014721 A1* | 1/2021 | Youn | H04W 28/24 |
| 2021/0329487 A1* | 10/2021 | Wang | H04W 28/24 |

OTHER PUBLICATIONS

"Extended European Search Report for European Application No. 21191830.5, dated Jan. 18, 2022, 8 pages".

* cited by examiner

*Primary Examiner* — Wutchung Chu
*Assistant Examiner* — Najeeb Ansari
(74) *Attorney, Agent, or Firm* — Steven Stupp; Stewart Wiener (57) ABSTRACT

An electronic device may receive multiple uplink packets or frames associated with a second electronic device. Then, based at least in part on information included in or associated with the group, the electronic device may unilaterally calculate the QoS of the multiple uplink packets or frames. Moreover, the electronic device may provide the multiple uplink packets of frames to a third electronic device. Next, the electronic device may receive multiple downlink packets or frames associated with the third electronic device. Furthermore, the electronic device may provide the multiple downlink packets or frames to the second electronic device, where additional multiple uplink packets or frames and/or the multiple downlink packets or frames have a priority corresponding to the calculated QoS.

20 Claims, 4 Drawing Sheets

UNILATERAL QUALITY-OF-SERVICE MIRRORING

CROSS REFERENCE TO RELATED APPLICATIONS

This application claims priority under 35 U.S.C. 119(e) to: U.S. Provisional Application Ser. No. 63/192,869, "Unilateral Quality-of-Service Mirroring," filed on May 25, 2021, by Peter G. Khoury; and U.S. Provisional Application Ser. No. 63/067,632, "Unilateral Quality-of-Service Mirroring," filed on Aug. 19, 2020, by Peter G. Khoury, the contents of both of which are herein incorporated by reference.

FIELD

The described embodiments relate to techniques for an access point to unilaterally provide quality-of-service (QoS) mirroring during communication with an electronic device.

BACKGROUND

Many electronic devices are capable of wirelessly communicating with other electronic devices. For example, these electronic devices can include a networking subsystem that implements a network interface for: a cellular network (UMTS, LTE, etc.), a wireless local area network or WLAN (e.g., a wireless network such as described in the Institute of Electrical and Electronics Engineers (IEEE) 802.11 standard or Bluetooth™ from the Bluetooth Special Interest Group of Kirkland, Washington), and/or another type of wireless network.

Many WLANs that are compatible with IEEE 802.11 standards have features that can improve the QoS. Packets or frames may be tagged with different QoS levels and can be treated different depending on their QoS level. For example, access points may assign different priorities to traffic associated with different access categories (such as voice, video, background, and best effort), so that more important traffic can pass first. However, proper use of the tags and proper treatment of the packets or frames may specify the QoS, and thus the user experience. When a packet or frame has an incorrect tag or when the tag is lost or stripped during transit through a network, the packet or frame may be assigned to a queue having an incorrect priority, which may degrade the communication performance (such as the latency), especially for real-time applications.

SUMMARY

An electronic device (such as an access point) that unilaterally calculates QoS of traffic is described. This electronic device includes an interface circuit that communicates with a second electronic device using wireless communication, and that communicates with a third electronic device using wired or wireless communication. During operation, the electronic device may receive multiple uplink packets or frames associated with the second electronic device. Then, based at least in part on information included in or associated with the multiple uplink packets or frames, the electronic device may unilaterally calculate (compute or determine) the QoS of the multiple uplink packets or frames. Moreover, the electronic device may provide the multiple uplink packets of frames addressed to the third electronic device. Next, the electronic device may receive multiple downlink packets or frames associated with the third electronic device. Furthermore, the electronic device may provide the multiple downlink packets or frames addressed to the second electronic device, where additional multiple uplink packets or frames and/or the multiple downlink packets or frames have a priority corresponding to the calculated QoS.

Note that the multiple uplink packets or frames may be associated with a data flow.

Moreover, the electronic device may provide the priority to the additional multiple uplink packets or frames and/or the multiple downlink packets or frames by assigning a given packet or frame to a queue corresponding to the priority.

Furthermore, the information may include: an Internet Protocol (IP) address, IP version, IP protocol, a packet version, an identifier of a source (such as a media access control or MAC address of the second electronic device), an identifier of a destination (such as a MAC address of the third electronic device), a size of a given packet in the multiple uplink packets or frames, or a communication port. Additionally, the information may specify one or more access categories associated with the multiple uplink packets or frames.

In some embodiments, the electronic device calculates the QoS without input (such as an instruction or a recommendation) from the second electronic device or the third electronic device.

Moreover, based at least in part on second information included in or associated with the multiple downlink packets or frames, the electronic device may unilaterally calculate the QoS of the multiple downlink packets or frames. For example, the second information may include: an IP address, IP version, IP protocol, a packet version, an identifier of a source (such as a MAC address of the third electronic device), an identifier of a destination (such as a MAC address of the second electronic device), a size of a given packet in the multiple downlink packets or frames, or a communication port. Additionally, the second information may specify one or more access categories associated with the multiple downlink packets or frames.

Furthermore, the electronic device may add a tag corresponding to the calculated QoS to a given packet or frame in the multiple uplink packets or frames and/or the multiple downlink packets or frames.

Additionally, the electronic device may calculate the QoS based at least in part on calculated QoSs of multiple uplink packets or frames in the multiple uplink packets or frames. For example, the calculated QoS may be a weighted average of the QoSs of the multiple uplink packets or frames in the multiple uplink packets or frames, where a weight of a given uplink packet or frame may correspond to an access category of the given uplink packet or frame. More generally, the calculated QoS may be a function of the QoSs of the multiple uplink packets or frames in the multiple uplink packets or frames.

In some embodiments, the calculated QoS is based at least in part on a fairness criterion that is based at least in part on a communication-performance metric associated with other traffic communicated by the electronic device.

Another embodiment provides a computer-readable storage medium for use with the electronic device. This computer-readable storage medium may include program instructions that, when executed by the electronic device, cause the electronic device to perform at least some of the aforementioned operations.

Another embodiment provides a method. This method includes at least some of the operations performed by the electronic device.

This Summary is provided for purposes of illustrating some exemplary embodiments, so as to provide a basic understanding of some aspects of the subject matter described herein. Accordingly, it will be appreciated that the above-described features are examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE FIGURES

Note that like reference numerals refer to corresponding parts throughout the drawings. Moreover, multiple instances of the same part are designated by a common prefix separated from an instance number by a dash.

DETAILED DESCRIPTION

An electronic device (such as an access point) that unilaterally calculates QoS of traffic is described. During operation, the electronic device may receive multiple uplink packets or frames associated with the second electronic device. Then, based at least in part on information included in or associated with the multiple uplink packets or frames, the electronic device may unilaterally calculate the QoS of the multiple uplink packets or frames. Moreover, the electronic device may provide the multiple uplink packets of frames addressed to the third electronic device. Next, the electronic device may receive multiple downlink packets or frames associated with the third electronic device. Furthermore, the electronic device may provide the multiple downlink packets or frames addressed to the second electronic device, where additional multiple uplink packets or frames (such as additional multiple uplink packets or frames that are subsequently received by the electronic device) and/or the multiple downlink packets or frames have a priority corresponding to the calculated QoS.

By unilaterally calculating the QoS of the multiple uplink packets or frames and then mirroring the QoS for the multiple downlink packets of frames, these communication techniques may provide improved communication performance (such as reduced latency for real-time applications) and reliability. For example, the QoS may not be dependent on a tag included in a given packet or frame. Consequently, the QoS may not be degrade by an incorrect or missing tag. Moreover, the calculating of the QoS may not require negotiation between the second electronic device and the electronic device. This may simplify configuration of the QoS functionality, may reduce the management overhead associated with the communication techniques, and may improve the responsiveness (e.g., by reducing or eliminating latency or delay) of the electronic device. Thus, the communication techniques may improve the user experience when using the electronic device, the second electronic device and an associated wireless network.

In the discussion that follows, electronic devices or components in a system communicate packets in accordance with a wireless communication protocol, such as: a wireless communication protocol that is compatible with an IEEE 802.11 standard (which is sometimes referred to as Wi-Fi®, from the Wi-Fi Alliance of Austin, Texas), Bluetooth, a cellular-telephone network or data network communication protocol (such as a third generation or 3G communication protocol, a fourth generation or 4G communication protocol, e.g., Long Term Evolution or LTE (from the 3rd Generation Partnership Project of Sophia Antipolis, Valbonne, France), LTE Advanced or LTE-A, a fifth generation or 5G communication protocol, or other present or future developed advanced cellular communication protocol), and/or another type of wireless interface (such as another wireless-local-area-network interface). For example, an IEEE 802.11 standard may include one or more of: IEEE 802.11a, IEEE 802.11b, IEEE 802.11g, IEEE 802.11-2007, IEEE 802.11n, IEEE 802.11-2012, IEEE 802.11-2016, IEEE 802.11ac, IEEE 802.11ax, IEEE 802.11ba, IEEE 802.11be, or other present or future developed IEEE 802.11 technologies. Moreover, an access point, a radio node, a base station or a switch in the wireless network may communicate with a local or remotely located computer (such as a controller) using a wired communication protocol, such as a wired communication protocol that is compatible with an IEEE 802.3 standard (which is sometimes referred to as 'Ethernet'), e.g., an Ethernet II standard. However, a wide variety of communication protocols may be used in the system, including wired and/or wireless communication. In the discussion that follows, Wi-Fi and Ethernet are used as illustrative examples.

Figure 1:
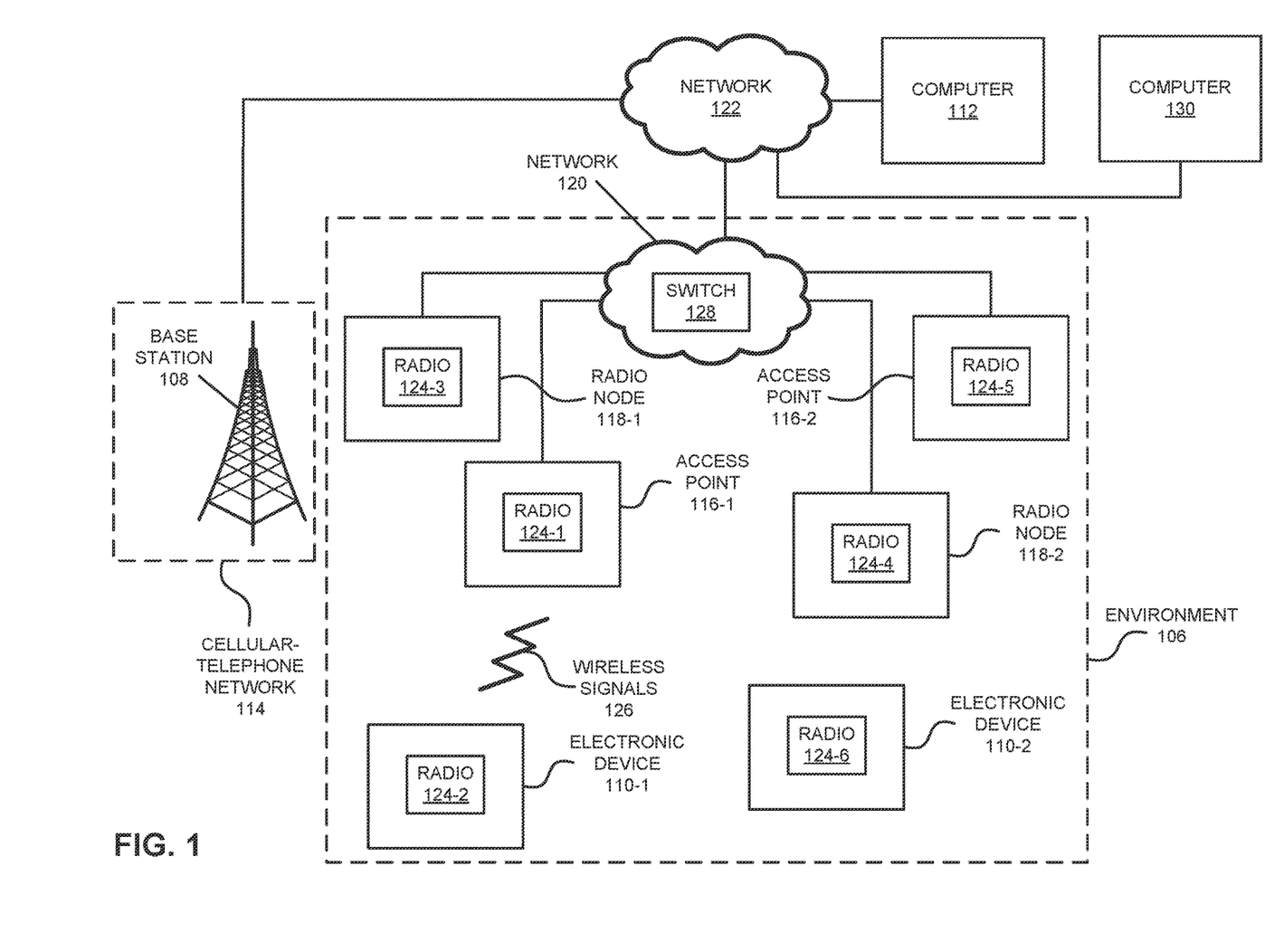
FIG. 1 is a block diagram illustrating an example of communication among electronic devices in accordance with an embodiment of the present disclosure.

We now describe some embodiments of the communication techniques. FIG. 1 presents a block diagram illustrating an example of communication in an environment 106 with one or more electronic devices 110 (such as cellular telephones, portable electronic devices, stations or clients, another type of electronic device, etc.) via a cellular-telephone network 114 (which may include a base station 108), one or more access points 116 (which may communicate using Wi-Fi) in a WLAN and/or one or more radio nodes 118 (which may communicate using LTE) in a small-scale network (such as a small cell). For example, the one or more radio nodes 118 may include: an Evolved Node B (eNodeB), a Universal Mobile Telecommunications System (UMTS) NodeB and radio network controller (RNC), a New Radio (NR) gNB or gNodeB (which communicates with a network with a cellular-telephone communication protocol that is other than LTE), etc. In the discussion that follows, an access point, a radio node or a base station are sometimes referred to generically as a 'communication device' or a 'computer network device.' Moreover, as noted previously, one or more base stations (such as base station 108), access points 116, and/or radio nodes 118 may be included in one or more wireless networks, such as: a WLAN, a small cell, and/or cellular-telephone network 114. In some embodiments, access points 116 may include a physical access point and/or a virtual access point that is implemented in software in an environment of an electronic device or a computer.

Note that access points 116 and/or radio nodes 118 may communicate with each other and/or computer 112 (which may be a controller that manages and/or configures access points 116, radio nodes 118 and/or switch 128, or that provides cloud-based storage and/or analytical services) using a wired communication protocol (such as Ethernet) via network 120 and/or 122. Note that computer 112 may be at the same location as the other components in environment 106 or may be located remotely (i.e., at a different location).

Moreover, note that networks 120 and 122 may be the same or different networks. For example, networks 120 and/or 122 may an intra-net or the Internet. In some embodiments, network 120 may include one or more routers and/or switches (such as switch 128). While not shown in FIG. 1, there may be additional or different components or electronic devices.

Figure 4:
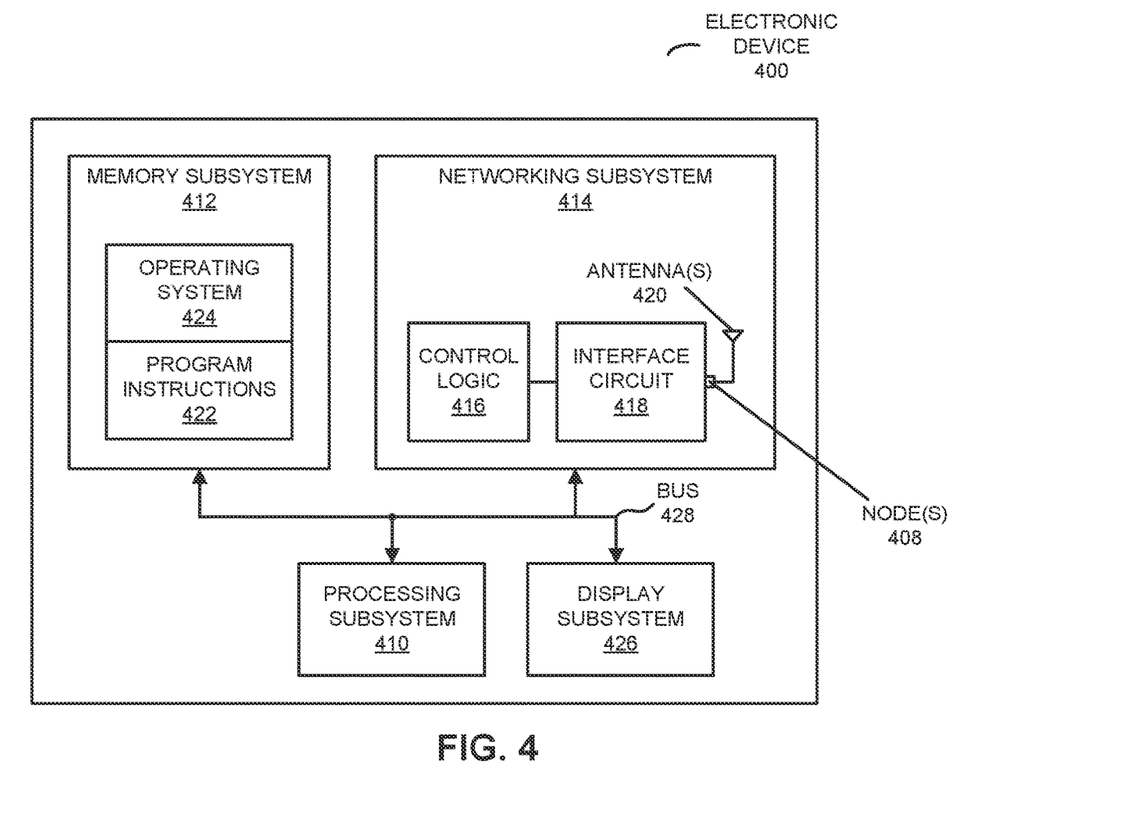
FIG. 4 is a block diagram illustrating an example of an electronic device in accordance with an embodiment of the present disclosure.

As described further below with reference to FIG. 4, electronic devices 110, computer 112, access points 116, radio nodes 118 and switch 128 may include subsystems, such as a networking subsystem, a memory subsystem and a processor subsystem. In addition, electronic devices 110, access points 116 and radio nodes 118 may include radios 124 in the networking subsystems. More generally, electronic devices 110, access points 116 and radio nodes 118 can include (or can be included within) any electronic devices with the networking subsystems that enable electronic devices 110, access points 116 and radio nodes 118 to wirelessly communicate with one or more other electronic devices. This wireless communication can comprise transmitting access on wireless channels to enable electronic devices to make initial contact with or detect each other, followed by exchanging subsequent data/management frames (such as connection requests and responses) to establish a connection, configure security options (e.g., Internet Protocol Security), transmit and receive frames or packets via the connection, etc.

During the communication in FIG. 1, access points 116 and/or radio nodes 118 and electronic devices 110 may wirelessly communicate while: transmitting access requests and receiving access responses on wireless channels, detecting one another by scanning wireless channels, establishing connections (for example, by transmitting connection requests and receiving connection responses), and/or transmitting and receiving frames or packets (which may include information as payloads).

As can be seen in FIG. 1, wireless signals 126 (represented by a jagged line) may be transmitted by radios 124 in, e.g., access points 116 and/or radio nodes 118 and electronic devices 110. For example, radio 124-1 in access point 116-1 may transmit information (such as one or more packets or frames) using wireless signals 126. These wireless signals are received by radios 124 in one or more other electronic devices (such as radio 124-2 in electronic device 110-1). This may allow access point 116-1 to communicate information to other access points 116 and/or electronic device 110-1. Note that wireless signals 126 may convey one or more packets or frames.

In the described embodiments, processing a packet or a frame in access points 116 and/or radio nodes 118 and electronic devices 110 may include: receiving the wireless signals with the packet or the frame; decoding/extracting the packet or the frame from the received wireless signals to acquire the packet or the frame; and processing the packet or the frame to calculate information contained in the payload of the packet or the frame.

Note that the wireless communication in FIG. 1 may be characterized by a variety of performance metrics, such as: a data rate for successful communication (which is sometimes referred to as 'throughput'), an error rate (such as a retry or resend rate), a mean-square error of equalized signals relative to an equalization target, intersymbol interference, multipath interference, a signal-to-noise ratio, a width of an eye pattern, a ratio of number of bytes successfully communicated during a time interval (such as 1-10 s) to an estimated maximum number of bytes that can be communicated in the time interval (the latter of which is sometimes referred to as the 'capacity' of a communication channel or link), and/or a ratio of an actual data rate to an estimated data rate (which is sometimes referred to as 'utilization'). While instances of radios 124 are shown in components in FIG. 1, one or more of these instances may be different from the other instances of radios 124.

In some embodiments, wireless communication between components in FIG. 1 uses one or more bands of frequencies, such as: a microwave frequency band, a radar frequency band, 900 MHz, 2.4 GHz, 5 GHz, 6 GHz, 60 GHz, the Citizens Broadband Radio Spectrum or CBRS (e.g., a frequency band near 3.5 GHz), and/or a band of frequencies used by LTE or another cellular-telephone communication protocol or a data communication protocol. Note that the communication between electronic devices may use multi-user transmission (such as orthogonal frequency division multiple access or OFDMA).

Although we describe the network environment shown in FIG. 1 as an example, in alternative embodiments, different numbers or types of electronic devices may be present. For example, some embodiments comprise more or fewer electronic devices. As another example, in another embodiment, different electronic devices are transmitting and/or receiving packets or frames.

As discussed previously, it can be difficult to provide or maintain QoS during communication between components in FIG. 1, such as during communication between an electronic device (such as electronic device 110-1) and a communication device or a computer network device (such as access point 116-1).

Figure 2:
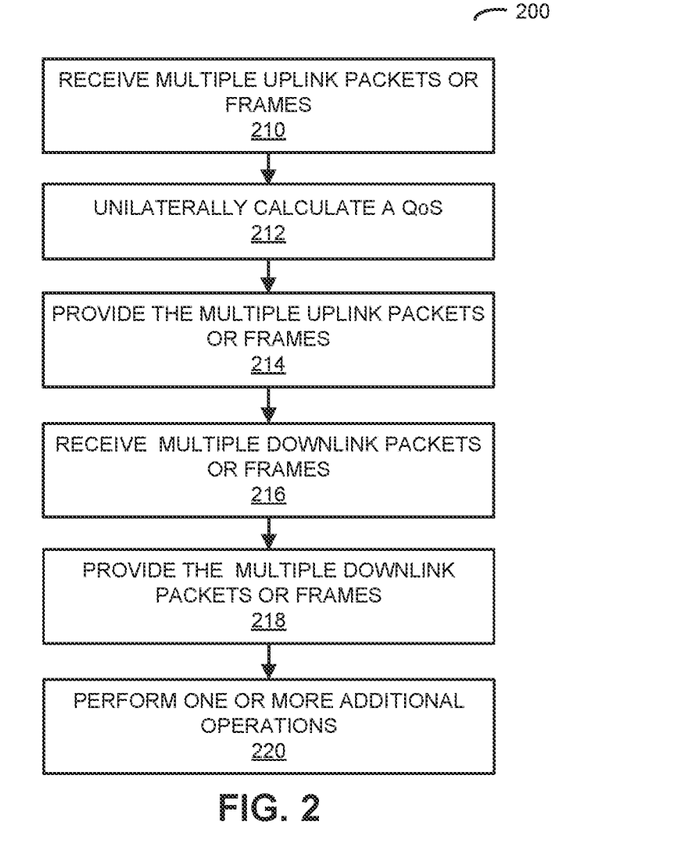
FIG. 2 is a flow diagram illustrating an example method for unilaterally calculating a QoS using an electronic device in FIG. 1 in accordance with an embodiment of the present disclosure.

As described further below with reference to FIGS. 2 and 3, in order to address these problems, an electronic device (such as access point 116-1 or radio node 118-1) may ensure QoS during communication with an electronic device (such as electronic device 110-1). In the discussion that follows, access point 116-1 is used to illustrate the communication techniques.

Notably, electronic device 110-1 may provide multiple uplink packets or frames to access point 116-1. For example, the multiple uplink packets or frames may be associated with a data flow. Then, based at least in part on information included in or associated with the multiple uplink packets or frames (and, optionally, a predefined QoS configuration), access point 116-1 may unilaterally calculate the QoS of the multiple uplink packets or frames. Note that the information may include: an IP address, IP version, IP protocol, a packet version, an identifier of a source (such as a MAC address of electronic device 110-1), an identifier of a destination (such as a MAC address of computer 130), a size of a given packet in the multiple uplink packets or frames, or a communication port. Additionally, the information may specify one or more access categories associated with the multiple uplink packets or frames. In some embodiments, access point 116-1 calculates the QoS without input (such as an instruction or a recommendation) from electronic device 116-1 or computer 130. Moreover, access point 116-1 may provide the multiple uplink packets of frames to computer 130, which may be a destination of the multiple uplink packets of frames. In some embodiments, a given uplink packet or frame may include QoS information that specifies a QoS of the given packet or frame (such as a user priority). However, in the communication techniques, access point 116-1 may calculate the QoS of multiple uplink packets or frames, e.g., based at least in part on the QoS information included in the individual uplink packets or frames (such as the average or a weighted average of the QoS information included in the individual uplink packets or frames).

Subsequently, computer 130 may provide multiple downlink packets or frames to access point 116-1. Furthermore, based at least in part on second information included in or associated with the multiple downlink packets or frames, access point 116-1 may unilaterally calculate the QoS of the multiple downlink packets or frames. For example, the second information may include: an IP address, IP version, IP protocol, a packet version, an identifier of a source (such as a MAC address of computer 130), an identifier of a destination (such as a MAC address of electronic device 110-1), a size of a given packet in the multiple downlink packets or frames, or a communication port. Additionally, the second information may specify one or more access categories associated with the multiple downlink packets or frames. In some embodiments, access point 116-1 may add a tag corresponding to the calculated QoS to a given packet or frame in the multiple uplink packets or frames and/or the multiple downlink packets or frames. For example, the given packet or frame may include a user priority or an access category, which is used to calculate or define the tag that is added to the given packet or frame.

Moreover, access point 116-1 may provide the multiple downlink packets or frames to electronic device 110-1, which may be a destination of the multiple downlink packets of frames. Note during the communication of the multiple uplink packets of frames, additional uplink packets or frames (such as additional multiple uplink packets or frames that are subsequently received by the electronic device) and/or the multiple downlink packets of frames, access point 116-1 may provide a priority corresponding to the calculated QoS to the multiple uplink packets of frames, the additional multiple uplink packets or frames and/or the multiple downlink packets of frames. For example, access point 116-1 may assign a given packet or frame to a queue corresponding to the priority. This queue may have a predefined latency or delay. Note that access point 116-1 may have multiple queues having different priorities, where traffic in a queue with a higher priority is processed before a queue with a lower priority. In some embodiments, uplink and downlink traffic may be assigned to different queues, which may have the same priority. (However, in other embodiments, the uplink and the downlink traffic may be assigned to queues having different priorities.)

Furthermore, access point 116-1 may calculate the QoS based at least in part on calculated QoSs of multiple uplink packets or frames in the multiple uplink packets or frames. For example, the calculated QoS may be a weighted average of the QoSs of the multiple uplink packets or frames in the multiple uplink packets or frames, where a weight of a given uplink packet or frame may correspond to an access category of the given uplink packet or frame. More generally, the calculated QoS may be a function of the QoSs of the multiple uplink packets or frames in the multiple uplink packets or frames. In some embodiments, the calculated QoS is based at least in part on a fairness criterion that is based at least in part on a communication-performance metric associated with other traffic communicated by access point 116-1. Thus, in some embodiments, access point 116-1 may adjust the calculated QoS to ensure fairness with the other traffic.

In these ways, an access point (and, more generally, a communication device or a computer network device) that use the communication techniques may intelligently provide QoS during communication with an electronic device. Notably, the access point may unilaterally calculate the QoS of uplink and/or downlink packets or frames, and may assign a bi-directional or bilateral priority during the communication based at least in part on the calculated QoS. Moreover, the calculating of the QoS may be performed dynamically, which may allow the access point to adapt to changes in a wireless environment (such as loading of the access point, available capacity, etc.). Consequently, the communication techniques may improve a user experience when a user uses the electronic device, the access point and the associated WLAN.

While the preceding discussion illustrated the communication techniques using a local implementation (such as in access point 116-1), in other embodiments the communication techniques may be implemented, at least in part, in a centralized manner (such as by computer 112) and/or in a distributed manner (such as collaboratively by multiple access points 116). Moreover, while the multiple uplink packets or frames and the multiple downlink packets or frames had the same QoS in the preceding discussion, in other embodiments the multiple uplink packets or frames and the multiple downlink packets or frames may have different QoS levels or values.

We now describe embodiments of the method. FIG. 2 presents an example of a flow diagram illustrating an example method 200 for unilaterally calculating a QoS, which may be performed by an electronic device, such as a communication device or a computer network device (e.g., access point 116-1 in FIG. 1). During operation, the electronic device may receive multiple uplink packets or frames (operation 210) associated with the second electronic device. Note that the multiple uplink packets or frames may be associated with a data flow.

Then, based at least in part on information included in or associated with the multiple uplink packets or frames, the electronic device may unilaterally calculate the QoS (operation 212) of the multiple uplink packets or frames. For example, the information may include: an Internet Protocol (IP) address, IP version, IP protocol, a packet version, an identifier of a source (such as a MAC address of the second electronic device), an identifier of a destination (such as a MAC address of the third electronic device), a size of a given packet in the multiple uplink packets or frames, or a communication port. Additionally, the information may specify one or more access categories associated with the multiple uplink packets or frames. In some embodiments, the electronic device calculates the QoS without input (such as an instruction or a recommendation) from the second electronic device or the third electronic device.

Moreover, the electronic device may provide (or transmit) the multiple uplink packets of frames (operation 214) to the third electronic device. Next, the electronic device may receive multiple downlink packets or frames (operation 216) associated with the third electronic device (such as a communication port in the third electronic device). Furthermore, the electronic device may provide (or transmit) the multiple downlink packets or frames (operation 218) to the second electronic device, where additional multiple uplink packets or frames (such as additional multiple uplink packets or frames that are subsequently received by the electronic device) and/or the multiple downlink packets or frames have a priority corresponding to the calculated QoS. Note that the electronic device may provide the priority to the multiple uplink packets or frames, the additional multiple uplink packets or frames and/or the multiple downlink packets or frames by assigning a given packet or frame to a queue corresponding to the priority.

In some embodiments, the electronic device performs one or more optional additional operations (operation 220). For example, based at least in part on second information included in or associated with the multiple downlink packets or frames, the electronic device may unilaterally calculate the QoS of the multiple downlink packets or frames. Note that the second information may include: an IP address, IP version, IP protocol, a packet version, an identifier of a source (such as a MAC address of the third electronic device), an identifier of a destination (such as a MAC address of the second electronic device), a size of a given packet in the multiple downlink packets or frames, or a communication port. Additionally, the second information may specify one or more access categories associated with the multiple downlink packets or frames.

Furthermore, the electronic device may add a tag corresponding to the calculated QoS to a given packet or frame in the multiple uplink packets or frames and/or the multiple downlink packets or frames.

Additionally, the electronic device may calculate the QoS based at least in part on calculated QoSs of multiple uplink packets or frames in the multiple uplink packets or frames. For example, the calculated QoS may be a weighted average of the QoSs of the multiple uplink packets or frames in the multiple uplink packets or frames, wherein a weight of a given uplink packet or frame may correspond to an access category of the given uplink packet or frame. More generally, the calculated QoS may be a function of the QoSs of the multiple uplink packets or frames in the multiple uplink packets or frames.

In some embodiments, the calculated QoS is based at least in part on a fairness criterion that is based at least in part on a communication-performance metric associated with other traffic communicated by the electronic device.

In some embodiments of method 200, there may be additional or fewer operations. Moreover, there may be different operations. Furthermore, the order of the operations may be changed, and/or two or more operations may be combined into a single operation.

Figure 3:
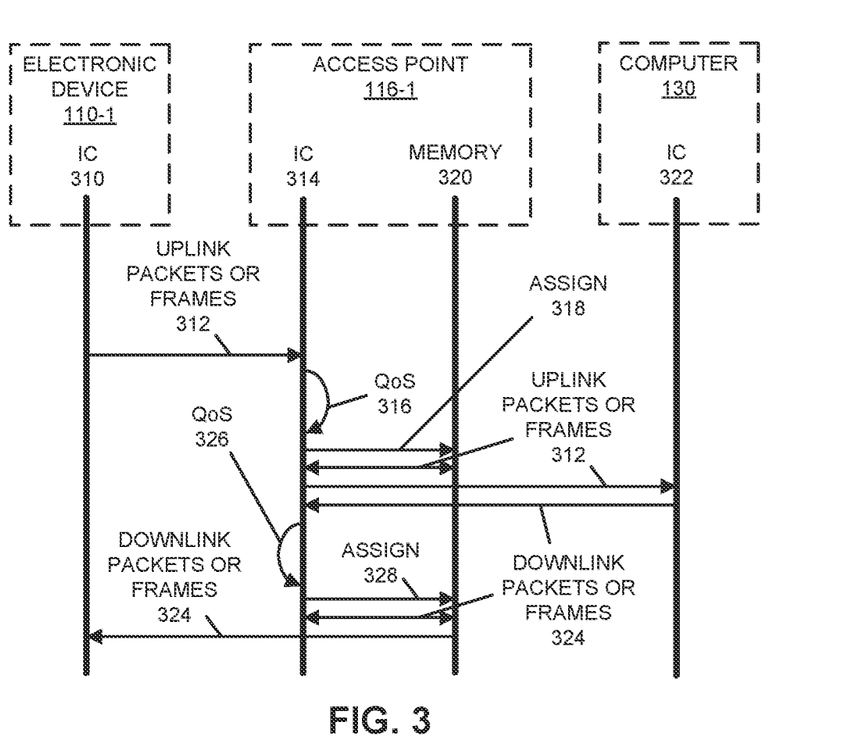
FIG. 3 is a drawing illustrating an example of communication among electronic devices in FIG. 1 in accordance with an embodiment of the present disclosure.

FIG. 3 presents a drawing illustrating an example of communication between electronic device 110-1, access point 116-1 and computer 130. In FIG. 3, an interface circuit (IC) 310 in electronic device 110-1 may provide multiple uplink packets or frames 312 to access point 116-1.

After receiving the multiple uplink packets or frames 312, an interface circuit 314 in access point 116-1 may unilaterally calculate a QoS 316 of the multiple uplink packets or frames 312 based at least in part on information included in or associated with the multiple uplink packets or frames 312. Then, interface circuit 312 may assign 318 the multiple uplink packets or frames 312 (and/or additional multiple uplink packets or frames, which are subsequently received by access point 116-1) to a queue in memory 320 in access point 116-1 having a priority corresponding to the calculated QoS 316. Moreover, interface circuit 312 may subsequently access the multiple uplink packets or frames 312 in the queue, and may provide the multiple uplink packets or frames 312 to computer 130, which may be received by an interface circuit 322 in computer 130.

Next, interface circuit 322 in computer 130 may provide multiple downlink packets or frames 324 to access point 116-1. After receiving the multiple downlink packets or frames 324, an interface circuit 314 in access point 116-1 may optionally calculate a QoS 326 of the multiple downlink packets or frames 324 based at least in part on information included in or associated with the multiple downlink packets or frames 324. Then, interface circuit 312 may assign 328 the multiple downlink packets or frames 324 to a queue in memory 320 having a priority corresponding to the calculated QoS 326. Alternatively, instead of calculating QoS 326, interface circuit 312 may assign 328 the multiple downlink packets or frames 324 to the queue or another queue in memory 320 having the priority corresponding to the calculated QoS 316.

Furthermore, interface circuit 312 may subsequently access the multiple downlink packets or frames 324 in the queue, and may provide the multiple downlink packets or frames 324 to electronic device 110-1, which may be received by interface circuit 310.

While FIG. 3 illustrates some operations using unilateral or bilateral communication (which are, respectively, represented by one-sided and two-sided arrows), in general a given operation in FIG. 3 may involve unilateral or bilateral communication.

In networking, and in Wi-Fi in particular, packets can be tagged with different QoS levels and can be treated differently depending on their QoS tag. However, the end-user experience may depend on the proper use of the tags and proper treatment of the packets.

For example, a user may be conducting a video call while they are downloading a large file. In this example, the packet stream/flow related to the video call may take precedence over the packets for the file download. Delivering the packets associated with the video conference quickly and reliably may ensure a reliable and responsive video link while only minimally slowing the file download. However, in this example, if both types of packets are treated equally, then the file download may use almost all of the available bandwidth. Without appropriate QoS tagging and delivery, the video conference packets may not be delivered quickly and the video call quality may suffer. In the worst case, the video-conference stream may fail.

Note that a Wi-Fi access point is typically at the edge of a network and is often a first hop by a packet in the network or the last hop off of the network. A client may have full control over the Ethernet stack and transport. If the client has a diligent and well-thought out implementation, then the client may ensure that uplink packets are tagged with the correct QoS. Notably, these packets may have both the correct user priority used by a Wi-Fi network, and may also have the correct IP-version (such as IPv4) QoS differentiated services code point (DSCP) tag that can be used by the rest of the network. Having the uplink packet correctly tagged with the appropriate user priority in a Wi-Fi network may ensure that this uplink packet is treated correctly. Thus, voice packets may be sent over the air first, followed by video packets, then background packets, and then best-effort packets.

Unfortunately, when a downlink packet arrives at an access point. the DSCP header or tag may not appropriate and/or correct. For example, a source may not have added the correct tag to a packet and/or sometimes some of the hops through the network (such as the Internet) may strip the DSCP tag from the downlink packet before it arrives at the access point. With the incorrect DSCP tag, the access point cannot appropriately place the downlink packet into the right voice, video, background, or best-effort user-priority queue. If the packets cannot be placed in the correct queue, then a user may suffer problems related to poor communication quality for real-time applications.

Recently, new wireless standards have been proposed to allow an electronic device (such as a 'client' or a 'station') that is associated with an access point to negotiate its QoS. For example, during this negotiation, the electronic device may provide a mask to an access point that is used to identify uplink traffic having a particular priority. Then, the access point may mirror this priority with downlink traffic to the electronic device. Thus, in these proposals, the electronic device may request that the access point 'mirror' the QoS service levels for the downlink packets based at least in part on the QoS characteristics of the uplink packets.

For example, the electronic device may tell the access point to mirror QoS based at least in part on an IP version, an IP protocol, and/or the IP address. Then, when the electronic device sends an uplink packet in a high-priority queue (such as video or voice), the access point may note that the packet was an IPv4 user datagram protocol (UDP) packet from address A and to address B. Moreover, when the access point receives an IPv4 UDP packet from address B to address A on the downlink (the mirror image of the uplink packet), the access point may tag this packet with the same QoS as was used on the uplink. Having the correct tag may allow the downlink packet to be placed in the correct queue, even if the DSCP QoS tag had been stripped out during communication via the Internet. Note that, in the proposed standard, the electronic device may tell the access point which characteristics it wishes the access point to use to implement this QoS mirroring.

In contrast, in the disclosed communication techniques, the access point may not be dependent on actions by the electronic device or client. Notably, the access point may have the ability to mirror the QoS of an uplink packet data stream on the downlink data stream without the electronic device having to send an explicit request that the access point do so.

In some embodiments, the access point may implement the mirroring in the face of ambiguity and/or when a malicious electronic device is trying to hog bandwidth. For example, during a combined video and voice phone call, packets in the uplink data stream from the electronic device may shift between video and voice user-priority queues. In this case, there may be an ambiguity as to whether the downlink packets should be put in the video or the voice queue. The access point may need to decide a queue from the two options. For example, a technique for making this decision may include mirroring the user priority of the last-received packet. Alternatively or additionally, a weighted average of the priority of the uplink data stream may be used to specify the downlink QoS.

Moreover, in some embodiments, during a time interval or a certain number of packets, there may be a predominance of certain packets. In these embodiments, the most-common of the uplink packet types may be mirrored. Alternatively or additionally, the weights may be biased towards the lowest of the multiple priorities used in the uplink data stream of packets.

Another problem is that mirroring implemented by a solo access point may result in an imbalance in the amount of throughput and/or airtime provided to a particular electronic device. For example, an electronic device may potentially get preferential treatment for its downlink packets by putting its uplink packets in the voice queue. Then, for this bad electronic-device actor, the downlink packets may return in the highest-priority voice queue. In some embodiments, this problem may be addressed using an airtime-fairness technique that equalize an electronic device that plays fair with an electronic device that does not play fair. Alternatively or additionally, the mirroring implemented by an access point may not throw off the throughput fairness between different electronic devices.

In some embodiments, the communication techniques are used to unilaterally select a priority for downlink traffic (such as a downlink flow) when uplink traffic (such as an uplink flow) switches between or has a number of different priorities. For example, pseudo-code for an example of the communication techniques is shown in Table 1. This approach may be advantageous because it may reduce or eliminate delays. Note that the priority of downlink packets may be selected after N uplink packets are considered (thus, there may be a delay of, e.g., several milliseconds, between the last of the uplink packets that is examined and the first downlink packet whose priority is changed.

TABLE 1

```
any_video_pkts = false;
any_voice_pkts = false;
For the first 30 packets
    if pkt_in == video
        any_video_pkts = true;
    if pkt_in == voice
        any_voice_pkts = true;
At the end of 30 pkts
    if (any_video_pkts == false) && (any_voice_pkts == false)
        do not mirror the downlink flow;
    elseif (any_video_pkts == false) && (any_voice_pkts = true)
        mirror the downlink flow with voice priority;
    else
        # (any_video_pkts == true) && (any_voice_pkts == false)
        # (any_video_pkts == true) && (any_voice_pkts == true)
        mirror the downlink flow with video priority.
```

Alternatively or additionally, in some embodiments of the communication techniques, an electronic device (such as an access point) may monitor a set of uplink packets and then may choose to mirror the priority of the uplink traffic identifier (TID) with the largest amount of traffic. For example, in 40 uplink packets a priority or access category of best effort may convey 1000 bytes, a priority of video may convey 28000 bytes, and a priority of voice may convey 5000 bytes, then the electronic device may mirror the downlink flow using video priority.

Note that an uplink flow may be categorized into eight different TID categories, 0 through 7. However, on downlink a packet may be assigned to one of four queues, 0 through 3. Therefore, in this example, there is a many-to-one and one-to-many problem. For example, an uplink flow may be in video_tid_4 or video_tid_5. Both of these uplink flows may be assigned to video_priority_2. However, when transmitted on downlink, video_priority_2 may appear as video_tid_5 when sniffed over the air. Consequently, in these embodiments, it may not appear that we are mirroring the traffic, because there is video_tid_4 on the uplink and video_tid_5 on the downlink. Nonetheless, because the uplink and the downlink traffic have the same priority, the desired effect of mirroring is present.

We now describe embodiments of an electronic device, which may perform at least some of the operations in the communication techniques. For example, the electronic device may include a component in FIG. 1, such as one of: one or more of electronic devices 110, one or more of access points 116, one or more of radio nodes 118, computer 112 and/or computer 130. FIG. 4 presents a block diagram illustrating an electronic device 400 in accordance with some embodiments. This electronic device includes processing subsystem 410, memory subsystem 412, and networking subsystem 414. Processing subsystem 410 includes one or more devices configured to perform computational operations. For example, processing subsystem 410 can include one or more microprocessors, ASICs, microcontrollers, programmable-logic devices, graphical processor units (GPUs) and/or one or more digital signal processors (DSPs).

Memory subsystem 412 includes one or more devices for storing data and/or instructions for processing subsystem 410 and networking subsystem 414. For example, memory subsystem 412 can include dynamic random access memory (DRAM), static random access memory (SRAM), and/or other types of memory (which collectively or individually are sometimes referred to as a 'computer-readable storage medium'). In some embodiments, instructions for processing subsystem 410 in memory subsystem 412 include: one or more program modules or sets of instructions (such as program instructions 422 or operating system 424), which may be executed by processing subsystem 410. Note that the one or more computer programs may constitute a computer-program mechanism. Moreover, instructions in the various modules in memory subsystem 412 may be implemented in: a high-level procedural language, an object-oriented programming language, and/or in an assembly or machine language. Furthermore, the programming language may be compiled or interpreted, e.g., configurable or configured (which may be used interchangeably in this discussion), to be executed by processing subsystem 410.

In addition, memory subsystem 412 can include mechanisms for controlling access to the memory. In some embodiments, memory subsystem 412 includes a memory hierarchy that comprises one or more caches coupled to a memory in electronic device 400. In some of these embodiments, one or more of the caches is located in processing subsystem 410.

In some embodiments, memory subsystem 412 is coupled to one or more high-capacity mass-storage devices (not shown). For example, memory subsystem 412 can be coupled to a magnetic or optical drive, a solid-state drive, or another type of mass-storage device. In these embodiments, memory subsystem 412 can be used by electronic device 400 as fast-access storage for often-used data, while the mass-storage device is used to store less frequently used data.

Networking subsystem 414 includes one or more devices configured to couple to and communicate on a wired and/or wireless network (i.e., to perform network operations), including: control logic 416, an interface circuit 418 and one or more antennas 420 (or antenna elements). (While FIG. 4 includes one or more antennas 420, in some embodiments electronic device 400 includes one or more nodes, such as nodes 408, e.g., a pad or a connector, which can be coupled to the one or more antennas 420. Thus, electronic device 400 may or may not include the one or more antennas 420.) For example, networking subsystem 414 can include a Bluetooth networking system, a cellular networking system (e.g., a 3G/4G/5G network such as UMTS, LTE, etc.), a USB networking system, a networking system based on the standards described in IEEE 802.11 (e.g., a Wi-Fi networking system), an Ethernet networking system, and/or another networking system.

In some embodiments, a transmit antenna radiation pattern of electronic device 400 may be adapted or changed using pattern shapers (such as reflectors) in one or more antennas 420 (or antenna elements), which can be independently and selectively electrically coupled to ground to steer the transmit antenna radiation pattern in different directions. Thus, if one or more antennas 420 includes N antenna-radiation-pattern shapers, the one or more antennas 420 may have $2^N$ different antenna-radiation-pattern configurations. More generally, a given antenna radiation pattern may include amplitudes and/or phases of signals that specify a direction of the main or primary lobe of the given antenna radiation pattern, as well as so-called 'exclusion regions' or 'exclusion zones' (which are sometimes referred to as 'notches' or 'nulls'). Note that an exclusion zone of the given antenna radiation pattern includes a low-intensity region of the given antenna radiation pattern. While the intensity is not necessarily zero in the exclusion zone, it may be below a threshold, such as 3 dB or lower than the peak gain of the given antenna radiation pattern. Thus, the given antenna radiation pattern may include a local maximum (e.g., a primary beam) that directs gain in the direction of an electronic device that is of interest, and one or more local minima that reduce gain in the direction of other electronic devices that are not of interest. In this way, the given antenna radiation pattern may be selected so that communication that is undesirable (such as with the other electronic devices) is avoided to reduce or eliminate adverse effects, such as interference or crosstalk.

Networking subsystem 414 includes processors, controllers, radios/antennas, sockets/plugs, and/or other devices used for coupling to, communicating on, and handling data and events for each supported networking system. Note that mechanisms used for coupling to, communicating on, and handling data and events on the network for each network system are sometimes collectively referred to as a 'network interface' for the network system. Moreover, in some embodiments a 'network' or a 'connection' between the electronic devices does not yet exist. Therefore, electronic device 400 may use the mechanisms in networking subsystem 414 for performing simple wireless communication between the electronic devices, e.g., transmitting frames and/or scanning for frames transmitted by other electronic devices.

Within electronic device 400, processing subsystem 410, memory subsystem 412, and networking subsystem 414 are coupled together using bus 428. Bus 428 may include an electrical, optical, and/or electro-optical connection that the subsystems can use to communicate commands and data among one another. Although only one bus 428 is shown for clarity, different embodiments can include a different number or configuration of electrical, optical, and/or electro-optical connections among the subsystems.

In some embodiments, electronic device 400 includes a display subsystem 426 for displaying information on a display, which may include a display driver and the display, such as a liquid-crystal display, a multi-touch touchscreen, etc.

Electronic device 400 can be (or can be included in) any electronic device with at least one network interface. For example, electronic device 400 can be (or can be included in): a desktop computer, a laptop computer, a subnotebook/netbook, a server, a computer, a mainframe computer, a cloud-based computer, a tablet computer, a smartphone, a cellular telephone, a smartwatch, a wearable device, a consumer-electronic device, a portable computing device, an access point, a transceiver, a controller, a radio node, a router, a switch, communication equipment, a wireless dongle, test equipment, and/or another electronic device.

Although specific components are used to describe electronic device 400, in alternative embodiments, different components and/or subsystems may be present in electronic device 400. For example, electronic device 400 may include one or more additional processing subsystems, memory subsystems, networking subsystems, and/or display subsystems. Additionally, one or more of the subsystems may not be present in electronic device 400. Moreover, in some embodiments, electronic device 400 may include one or more additional subsystems that are not shown in FIG. 4. Also, although separate subsystems are shown in FIG. 4, in some embodiments some or all of a given subsystem or component can be integrated into one or more of the other subsystems or component(s) in electronic device 400. For example, in some embodiments program instructions 422 are included in operating system 424 and/or control logic 416 is included in interface circuit 418.

Moreover, the circuits and components in electronic device 400 may be implemented using any combination of analog and/or digital circuitry, including: bipolar, PMOS and/or NMOS gates or transistors. Furthermore, signals in these embodiments may include digital signals that have approximately discrete values and/or analog signals that have continuous values. Additionally, components and circuits may be single-ended or differential, and power supplies may be unipolar or bipolar.

An integrated circuit (which is sometimes referred to as a 'communication circuit' or a 'means for communication') may implement some or all of the functionality of networking subsystem 414. The integrated circuit may include hardware and/or software mechanisms that are used for transmitting wireless signals from electronic device 400 and receiving signals at electronic device 400 from other electronic devices. Aside from the mechanisms herein described, radios are generally known in the art and hence are not described in detail. In general, networking subsystem 414 and/or the integrated circuit can include any number of radios. Note that the radios in multiple-radio embodiments function in a similar way to the described single-radio embodiments.

In some embodiments, networking subsystem 414 and/or the integrated circuit include a configuration mechanism (such as one or more hardware and/or software mechanisms) that configures the radio(s) to transmit and/or receive on a given communication channel (e.g., a given carrier frequency). For example, in some embodiments, the configuration mechanism can be used to switch the radio from monitoring and/or transmitting on a given communication channel to monitoring and/or transmitting on a different communication channel. (Note that 'monitoring' as used herein comprises receiving signals from other electronic devices and possibly performing one or more processing operations on the received signals)

In some embodiments, an output of a process for designing the integrated circuit, or a portion of the integrated circuit, which includes one or more of the circuits described herein may be a computer-readable medium such as, for example, a magnetic tape or an optical or magnetic disk. The computer-readable medium may be encoded with data structures or other information describing circuitry that may be physically instantiated as the integrated circuit or the portion of the integrated circuit. Although various formats may be used for such encoding, these data structures are commonly written in: Caltech Intermediate Format (CIF), Calma GDS II Stream Format (GDSII) or Electronic Design Interchange Format (EDIF). Those of skill in the art of integrated circuit design can develop such data structures from schematics of the type detailed above and the corresponding descriptions and encode the data structures on the computer-readable medium. Those of skill in the art of integrated circuit fabrication can use such encoded data to fabricate integrated circuits that include one or more of the circuits described herein.

While the preceding discussion used Wi-Fi and/or Ethernet communication protocols as illustrative examples, in other embodiments a wide variety of communication protocols and, more generally, communication techniques may be used. Thus, the communication techniques may be used in a variety of network interfaces. Furthermore, while some of the operations in the preceding embodiments were implemented in hardware or software, in general the operations in the preceding embodiments can be implemented in a wide variety of configurations and architectures. Therefore, some or all of the operations in the preceding embodiments may be performed in hardware, in software or both. For example, at least some of the operations in the communication techniques may be implemented using program instructions 422, operating system 424 (such as a driver for interface circuit 418) or in firmware in interface circuit 418. Alternatively or additionally, at least some of the operations in the communication techniques may be implemented in a physical layer, such as hardware in interface circuit 418.

In the preceding description, we refer to 'some embodiments.' Note that 'some embodiments' describes a subset of all of the possible embodiments, but does not always specify the same subset of embodiments. Moreover, note that numerical values in the preceding embodiments are illustrative examples of some embodiments. In other embodiments of the communication technique, different numerical values may be used.

The foregoing description is intended to enable any person skilled in the art to make and use the disclosure, and is provided in the context of a particular application and its requirements. Moreover, the foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art, and the general principles defined herein may be applied to other embodiments and applications without departing from the spirit and scope of the present disclosure. Additionally, the discussion of the preceding embodiments is not intended to limit the present disclosure. Thus, the present disclosure is not intended to be limited to the embodiments shown, but is to be accorded the widest scope consistent with the principles and features disclosed herein.

What is claimed is:

1. An electronic device, comprising:
an antenna; and
an interface circuit, coupled to the antenna, configured to communicate with a second electronic device using wireless communication, and configured to communicate with a third electronic device using wired or wireless communication, wherein the interface circuit is configured to:
receive multiple uplink packets or frames associated with the second electronic device;
unilaterally calculate a quality of service (QoS) of the multiple uplink packets or frames based at least in part on information included in or associated with the multiple uplink packets or frames, wherein the information comprises: an Internet Protocol (IP) address, IP version, IP protocol, a packet version, an identifier of the second electronic device, an identifier of the third electronic device, a size of a given packet in the multiple uplink packets or frames, or a communication port;
provide the multiple uplink packets or frames addressed to the third electronic device;

receive multiple downlink packets or frames associated with the third electronic device; and provide the multiple downlink packets or frames addressed to the second electronic device, wherein additional multiple uplink packets or frames after the multiple uplink packets or frame, the multiple downlink packets or frames, or the additional multiple uplink packets or frames and the multiple downlink packets or frames have a priority corresponding to the calculated QoS, and wherein the interface circuit is configured to add a tag corresponding to the calculated QoS to a given packet or frame in the multiple uplink packets or frames, the multiple downlink packets or frames, or both.

2. The electronic device of claim 1, wherein the multiple uplink packets or frames is associated with a data flow.

3. The electronic device of claim 1, wherein the interface circuit is configured to provide the priority to the additional multiple uplink packets or frames, the multiple downlink packets or frames or both by assigning a given packet or frame to a queue corresponding to the priority.

4. The electronic device of claim 1, wherein the information specifies one or more access categories associated with the multiple uplink packets or frames.

5. The electronic device of claim 1, wherein the interface circuit is configured to calculate the QoS without input from the second electronic device or the third electronic device.

6. The electronic device of claim 1, wherein the interface circuit is configured to unilaterally calculate the QoS of the multiple downlink packets or frames based at least in part on second information included in or associated with the multiple downlink packets or frames.

7. The electronic device of claim 6, wherein the second information comprises: an Internet Protocol (IP) address, IP version, IP protocol, a packet version, an identifier of the third electronic device, an identifier of the second electronic device, a size of a given packet in the multiple downlink packets or frames, or a communication port.

8. The electronic device of claim 6, wherein the second information specifies one or more access categories associated with the multiple downlink packets or frames.

9. The electronic device of claim 1, wherein the interface circuit is configured to calculate the QoS based at least in part on calculated QoSs of multiple uplink packets or frames in the multiple uplink packets or frames.

10. The electronic device of claim 9, wherein the calculated QoS is a weighted average of the QoSs of the multiple uplink packets or frames in the multiple uplink packets or frames; and wherein a weight of a given uplink packet or frame corresponds to an access category of the given uplink packet or frame.

11. The electronic device of claim 9, wherein the calculated QoS is a function of the QoSs of the multiple uplink packets or frames in the multiple uplink packets or frames.

12. The electronic device of claim 1, wherein the calculated QoS is a based at least in part on a fairness criterion that is based at least in part on a communication-performance metric associated with other traffic communicated by the electronic device.

13. A non-transitory computer-readable storage medium for use in conjunction with an electronic device, the computer-readable storage medium storing program instructions, wherein, when executed by the electronic device, the program instructions cause the electronic device to perform one or more operations comprising:

receiving multiple uplink packets or frames associated with a second electronic device;

unilaterally calculating a quality of service (QoS) of the multiple uplink packets or frames based at least in part on information included in or associated with the multiple uplink packets or frames, wherein the information comprises: an Internet Protocol (IP) address, IP version, IP protocol, a packet version, an identifier of the second electronic device, an identifier of the third electronic device, a size of a given packet in the multiple uplink packets or frames, or a communication port;

providing the multiple uplink packets or frames addressed to a third electronic device;

receiving multiple downlink packets or frames associated with the third electronic device; and providing the multiple downlink packets or frames addressed to the second electronic device, wherein additional multiple uplink packets or frames after the multiple uplink packets or frame, the multiple downlink packets or frames, or the additional multiple uplink packets or frames and the multiple downlink packets or frames have a priority corresponding to the calculated QoS, and wherein the providing the multiple uplink packets or frames, providing the multiple downlink packets or frames, or both comprises adding a tag corresponding to the calculated QoS to a given packet or frame in the multiple uplink packets or frames, the multiple downlink packets or frames, or both.

14. The non-transitory computer-readable storage medium of claim 13, wherein the electronic device provides the priority to the additional multiple uplink packets or frames, the multiple downlink packets or frames or both by assigning a given packet or frame to a queue corresponding to the priority.

15. The non-transitory computer-readable storage medium of claim 13, wherein the QoS is calculated based at least in part on calculated QoSs of multiple uplink packets or frames in the multiple uplink packets or frames.

16. A method for unilaterally calculating a quality of service (QoS) of traffic, comprising:

by an electronic device:

receiving multiple uplink packets or frames associated with a second electronic device;

unilaterally calculating the QoS of the multiple uplink packets or frames based at least in part on information included in or associated with the multiple uplink packets or frames, wherein the information comprises: an Internet Protocol (IP) address, IP version, IP protocol, a packet version, an identifier of the second electronic device, an identifier of the third electronic device, a size of a given packet in the multiple uplink packets or frames, or a communication port;

providing the multiple uplink packets or frames addressed to a third electronic device;

receiving multiple downlink packets or frames associated with the third electronic device; and providing the multiple downlink packets or frames addressed to the second electronic device, wherein additional multiple uplink packets or frames after the multiple uplink packets or frame, the multiple downlink packets or frames, or the additional multiple uplink packets or frames and the multiple downlink packets or frames have a priority corresponding to the calculated QoS, and wherein the providing the multiple uplink packets or frames, providing the multiple downlink packets or frames, or both comprises adding a tag corresponding to the calculated QoS to a given packet or frame in the multiple uplink packets or frames, the multiple downlink packets or frames, or both.

17. The method of claim 16, wherein the electronic device provides the priority to additional multiple uplink packets or frames, the multiple downlink packets or frames or both by assigning a given packet or frame to a queue corresponding to the priority.

18. The method of claim 16, wherein the QoS is calculated based at least in part on calculated QoSs of multiple uplink packets or frames in the multiple uplink packets or frames.

19. The method of claim 16, wherein the information specifies one or more access categories associated with the multiple uplink packets or frames.

20. The method of claim 16, wherein the method comprises unilaterally calculating the QoS of the multiple downlink packets or frames based at least in part on second information included in or associated with the multiple downlink packets or frames.

* * * * *